No. 790,810. PATENTED MAY 23, 1905.
P. N. STAFF.
PIPE COUPLING.
APPLICATION FILED JULY 27, 1904.

WITNESSES:
J. Spragg Poole
L. B. Middleton

INVENTOR
Peter N. Staff.
BY Herbert W. Jenner.
Attorney

No. 790,810. Patented May 23, 1905.

UNITED STATES PATENT OFFICE.

PETER N. STAFF, OF TERRE HAUTE, INDIANA.

PIPE-COUPLING.

SPECIFICATION forming part of Letters Patent No. 790,810, dated May 23, 1905.

Application filed July 27, 1904. Serial No. 218,358.

*To all whom it may concern:*

Be it known that I, PETER N. STAFF, a citizen of the United States, residing at Terre Haute, in the county of Vigo and State of Indiana, have invented certain new and useful Improvements in Pipe-Couplings; and I do hereby declare the following to be a full, clear, and exact description of the invention, such as will enable others skilled in the art to which it appertains to make and use the same.

This invention relates to devices for coupling together sections of pipes and for mending broken pipes; and it consists in the novel construction and combination of the parts hereinafter fully described and claimed.

Figure 1:
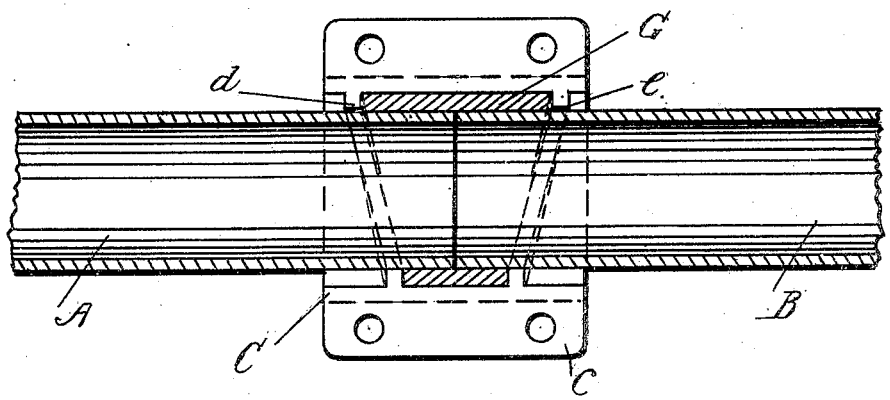
Figure 2:
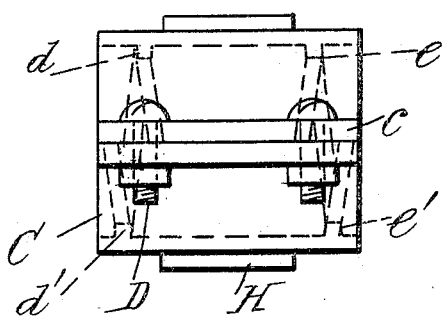
Figure 3:
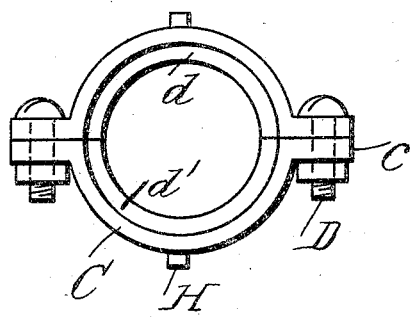
Figure 4:
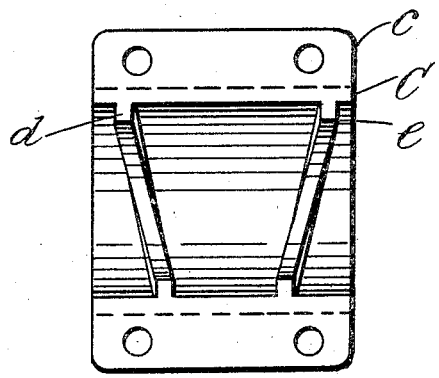

In the drawings, Figure 1 is a longitudinal section through two pipe-sections provided with a coupling according to this invention. Fig. 2 is a side view of the thimble. Fig. 3 is an end view of the thimble. Fig. 4 is an inside view of one-half of the thimble.

A and B are two pipe-sections or two portions of a broken pipe.

C is a coupling-thimble. This thimble is cylindrical, and it is made in two halves provided with flanges $c$.

D represents the bolts securing the two halves of the thimble together. These bolts pass through holes in the flanges $c$. The halves of the thimble are provided with spiral projections $d\ d'$ and $e\ e'$. The projections $e'$ and $d'$ form a continuation of the projections $e$ and $d$. The projections $d\ d'$ are arranged at one end of the thimble and are inclined in the opposite direction to the projections $e\ e'$, which are arranged at the other end of the thimble and upon its internal surface. The projections form one screw-thread at each end of the thimble.

G is a liner, of lead or other soft metal, which surrounds the end portions of the pipe-sections. The pipe-sections, or the broken portions of a pipe, are fitted together as snugly as possible, and the halves of the thimble are then bolted together so as to encircle them. The lead liner is then run into the thimble, the ends of which are closed with clay and oakum until the melted lead has been poured into place. The thimble is then partially revolved, so that the spiral projections pack the soft metal tightly upon the end portions or sections of the pipe, and the lead does not require to be stemmed to keep the joint from leaking.

H represents projections on the thimble which assist in turning or revolving it on the pipe, as they enable the operator to get a firm grip upon it.

What I claim is—

1. The combination, with two pipe-sections, of a coupling-thimble provided at its end portions with right and left spiral projections for packing the liner, and a liner of soft material between the said pipe-sections and the middle part of the said thimble.

2. A pipe-coupling thimble formed in longitudinal sections and provided at its end portions with right and left hand spiral projections for packing the liner, and means for securing the said thimble-sections together.

3. The combination, with two pipe-sections, of a coupling-thimble formed in longitudinal sections and provided at its end portions with right and left hand spiral projections for packing the liner, means for securing the said thimble-sections together, and a liner of soft material between the said pipe-sections and the middle part of the said thimble.

In testimony whereof I have affixed my signature in the presence of two witnesses.

PETER N. STAFF.

Witnesses:
JAMES T. LAUGHEAD,
ALBERT CATLIN.